Dec. 25, 1951  F. ADAMS  2,579,640
MOLD FOR FORMING A PRECUT ICE CREAM CAKE
Filed July 21, 1950  2 SHEETS—SHEET 1
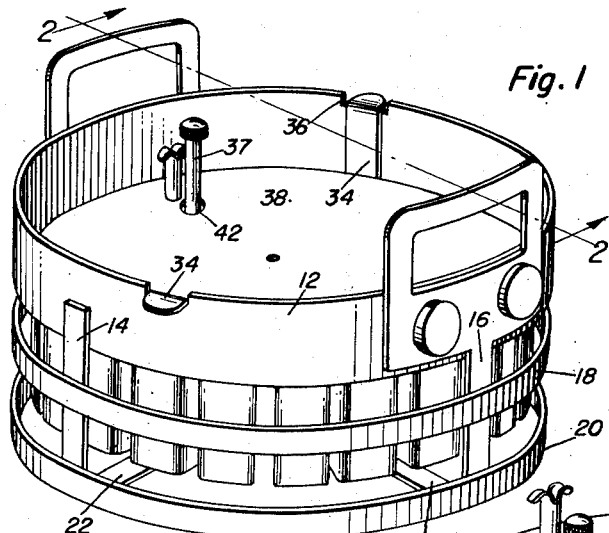
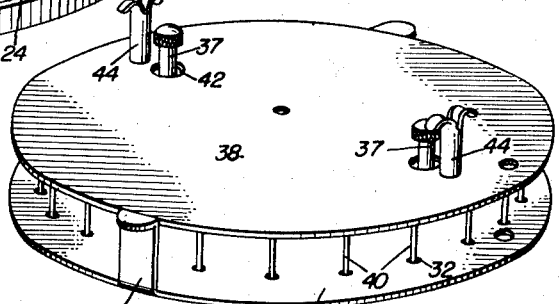
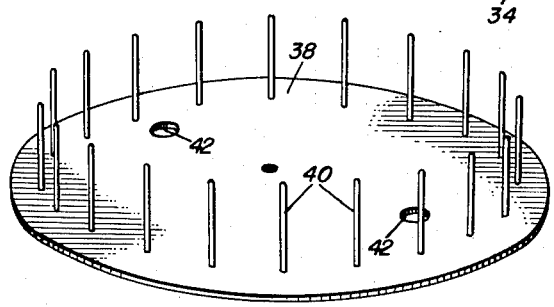
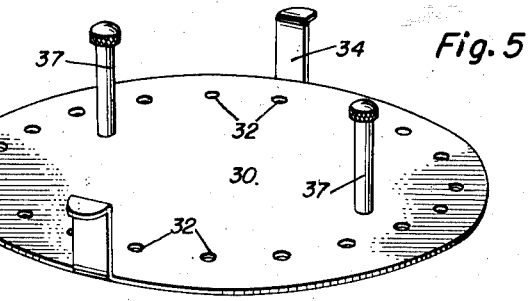
Frank Adams
INVENTOR.
BY *Clarence A. O'Brien*
and *Harvey B. Jackson*
Attorneys Dec. 25, 1951    F. ADAMS    2,579,640
MOLD FOR FORMING A PRECUT ICE CREAM CAKE
Filed July 21, 1950    2 SHEETS—SHEET 2

Frank Adams
INVENTOR.

Patented Dec. 25, 1951

2,579,640

UNITED STATES PATENT OFFICE 2,579,640

MOLD FOR FORMING A PRECUT ICE CREAM CAKE

Frank Adams, Brooklyn, N. Y.

Application July 21, 1950, Serial No. 175,159

1 Claim. (Cl. 107—19)

This invention relates to a molding apparatus and more particularly to a mold forming a precut ice cream cake as is defined in the co-pending application Serial No. 44.564, filed August 16, 1948, now Patent No. 2,520,522, dated August 29, 1950, the disclosure of which application is included in this application.

An object of this invention is to provide a mold for forming an ice cream cake having a plurality of individual servings which are formed in an assembled unitary pattern or group and which may be artistically decorated or frosted in a desired manner.

Another object of this invention is to provide a mold for forming an ice cream cake having a plurality of individual frozen segments arranged in a predetermined pattern and having edible separators positioned between the adjacent sections of the segments, with a shell of edible confections substantially covering the segments to retain them unitarily, and edible division markers positioned on the shell in alignment with the edible separators so that the individual servings may be easily removed from the cake by employing a conventional kitchen or table knife and position the same downwardly through the division markers in the manner of cutting a baked confection.

A further object of this invention is to provide a mold having means whereby the ice cream cake may be readily removed from the mold without disturbing the pattern of the individual frozen segments of the ice cream cake.

Still further objects of the invention reside in the provision of a mold that is strong, durable, highly efficient in operation, simple in construction and manufacture, capable of being easily used to produce highly attractive and tasteful confections, and which mold will be able to produce the ice cream cake at a relatively low cost.

These, together with the various ancillary objects of the invention which will become apparent as the following description proceeds, are attained by this mold for forming a pre-cut ice cream, a preferred embodiment of which has been illustrated in the accompanying drawings, by way of example only, wherein:

Figure 1 is a perspective view of the mold comprising the present invention;

Figure 3 is a perspective view of the rack;

Figure 4 is an inverted perspective view of the rack plate;

Figure 5 is a perspective view of the stripping disc of the rack;

Figure 2:
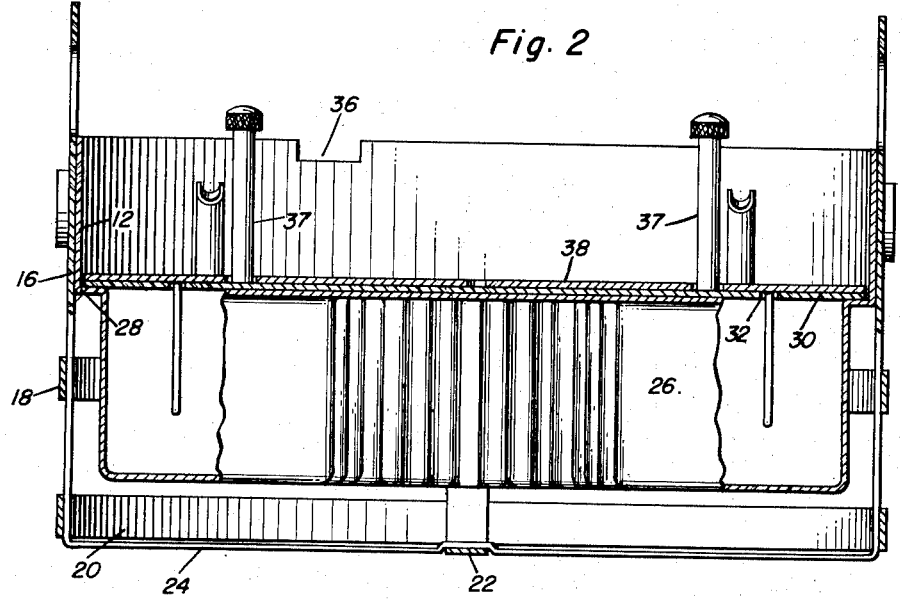
Figure 2 is a vertical sectional view as taken along the line 2—2 of Figure 1.
Figure 6:
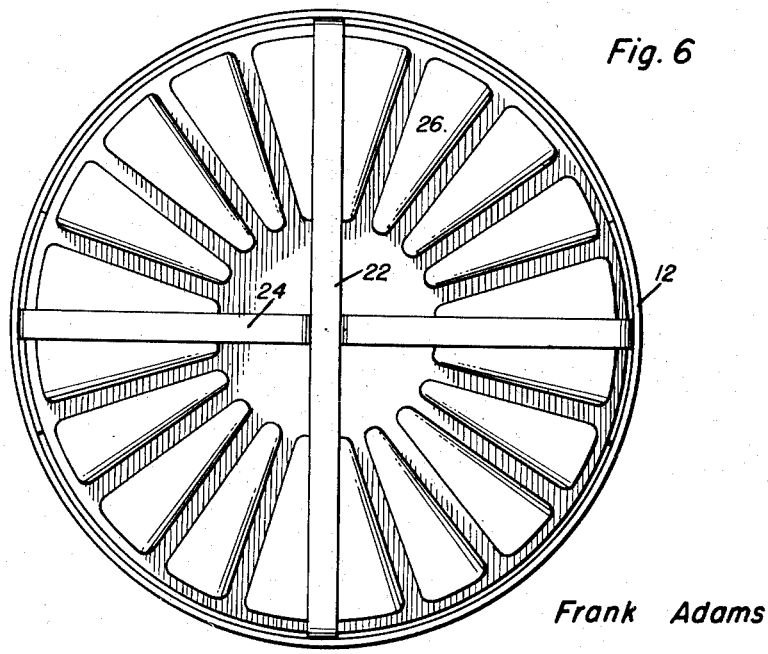
Figure 6 is a bottom plan view of the mold.

With continuing reference to the accompanying drawings wherein like reference numerals designate similar parts throughout the various views, reference numeral 10 generally designates the mold comprising the present invention which includes a cylindrical ring or pan 12 having vertical supporting members 14 and handle members 16 attached thereto as by welding and to which vertical members and handle members there are attached rings 18 and 20. Terminally and rigidly secured to the bottom ring 20 are braces 22 and 24 which rigidify the structure.

A plurality of compartments or chambers 26 are welded or otherwise secured to the ring 12 and are inwardly annularly offset therefrom by means of the annular shoulder 28. Rings 18 and 20 provide means for supporting the mold in order that the cold air may readily circulate about the segmented compartments 26 in order to more easily freeze the contents thereof after the ice cream mixture has been poured therein.

Supported by the shoulder 28 is a stripping disc 30 having a plurality of apertures 32 therethrough and having L-shaped lugs 34 upwardly extending from opposed peripheral portions thereof. These lugs 34 are adapted to become engaged within the notches 36 formed in the upper edge of the cylindrical member 12. A pair of upwardly extending push rods 37 are secured to the disc 30.

Positioned on the disc 30 is a circular plate 38 having a plurality of downwardly extending impaling pins 40 secured thereto and extending therefrom. There are also provided apertures or openings 42 in the plate 38 in order that the push rods 37 may extend therethrough.

Handle members 44 are secured to the plate 38 and extend upwardly therefrom. Hence, when it is desired to lift the plate 38 from the disc 30, it is merely necessary to press down on the push rods 37 and pull up on the handle members 44.

In use, the compartments 26 of the mold are first filled with a suitable mixture as is described in the above identified co-pending application and when the base plate 30 is positioned on top the cover plate is then positioned on the base plate with the impaling members 40 extending through the apertures 32 and into the compartments 26. The filled mold is then placed in a suitable freezer for freezing the mix in the compartments or chambers 26. The mold is then removed from the freezer and the frozen segments in the chambers 26 are then loosened from the walls of said chambers. This may be accomplished by dipping the chambers 26 in warm water. Then, through the medium of the handles 44, the plate 30, with the loosened frozen segments impaled on the pins 40 of the plate 38, is lifted out of the mold, thus removing said segments from the chambers 26. The frozen segments, still on the pins 40, are placed on a suitable supporting surface. Then, while holding the plate 30 stationary through the medium of the elements 37, the plate 38 is elevated by the handles 44 for stripping the frozen segments from the pins 40 thereby leaving the frozen segments undisturbed on the supporting surface. The angular lugs 34, engageable in the notches 36, facilitate insertion of the pins 40 in the chambers 26, positively secure the rack against rotary movement in the circular mold and, further, may be utilized as handles for lifting or handling the rack.

Since from the foregoing the construction and advantages of this mold for forming a precut ice cream cake are readily apparent, any further description is believed to be unnecessary. However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

Having described the invention, what is claimed as new is:

An ice cream cake mold comprising an annular pan having diametrically opposite notches in its upper edge, a plurality of spaced, radial, segmental chambers depending from the bottom of the pan, a removable apertured stripping disc resting on the pan bottom and closing the chambers, angular lift handles rising from the periphery of the stripping disc and engaged in the notches, a circular plate mounted for vertical movement on the stripping disc, and impaling pins on said plate operable in the apertures of the stripping disc and engageable in the chambers.

FRANK ADAMS.

REFERENCES CITED

The following references are of record in the file of this patent:

UNITED STATES PATENTS

| Number | Name | Date |
| --- | --- | --- |
| 1,470,525 | Burt | Oct. 9, 1923 |
| 1,871,755 | Smith | Aug. 16, 1932 |
| 1,926,548 | Mears | Sept. 12, 1933 |
| 2,111,498 | Thomas et al. | Mar. 15, 1938 |
| 2,165,789 | Elwell | July 11, 1939 |
| 2,176,409 | Peterson | Oct. 17, 1939 |
| 2,204,474 | Cowling | June 11, 1940 |
| 2,274,464 | Thomas | Feb. 24, 1942 |
| 2,320,985 | Overland | June 1, 1943 |